United States Patent [19]
Eriksson

[11] Patent Number: 5,825,152
[45] Date of Patent: Oct. 20, 1998

[54] LOAD-COMMUTATED SYNCHRONOUS MOTOR DRIVE

[75] Inventor: Per-Lennart Eriksson, Västerås, Sweden

[73] Assignee: ABB Industry OY, Helsinki, Finland

[21] Appl. No.: 750,086

[22] PCT Filed: Jun. 29, 1995

[86] PCT No.: PCT/SE95/00807

§ 371 Date: Mar. 10, 1997

§ 102(e) Date: Mar. 10, 1997

[87] PCT Pub. No.: WO96/01523

PCT Pub. Date: Jan. 18, 1996

[30] Foreign Application Priority Data

Jul. 1, 1994 [SE] Sweden .................................. 9402326

[51] Int. Cl.$^6$ .............................. H02P 1/46; H02K 23/00; H02J 1/00
[52] U.S. Cl. ........................... 318/700; 318/803; 318/254; 307/83; 363/37
[58] Field of Search ..................................... 318/690–695, 318/700–724, 801–803, 807–817, 254, 439, 138–158; 363/37, 52–54, 55–58; 307/82, 83, 84, 43

[56] References Cited

U.S. PATENT DOCUMENTS

| | | |
|---|---|---|
| 3,339,083 | 8/1967 | Uhlmann .................................. 307/83 |
| 3,740,638 | 6/1973 | Thorborg ..................................... 321/5 |
| 3,887,862 | 6/1975 | Hubner ................................ 318/138 X |
| 4,084,220 | 4/1978 | Akamatsu ................................. 363/37 |
| 4,488,101 | 12/1984 | Studtmann . |
| 4,565,957 | 1/1986 | Gary et al. . |
| 4,602,199 | 7/1986 | Walker ..................................... 318/798 |
| 4,607,206 | 8/1986 | Sember et al. .......................... 318/798 |
| 4,648,018 | 3/1987 | Neupauer .................................. 363/35 |
| 4,654,572 | 3/1987 | Hirata . |
| 4,814,964 | 3/1989 | Schauder et al. .......................... 363/37 |
| 4,873,478 | 10/1989 | Weiss ....................................... 318/779 |
| 5,717,580 | 2/1998 | Karlecik-Maier ......................... 363/35 |

FOREIGN PATENT DOCUMENTS 1306193  7/1973  United Kingdom .

*Primary Examiner*—Brian Sircus
*Attorney, Agent, or Firm*—Watson Cole Grindle Watson P.L.L.C.

[57] ABSTRACT

A load-commutated synchronous motor drive has a line-commutated network-side converter (3), a current-source dc intermediate link (PL, NL, 5) and a load-commutated machine-side converter (2) for connection to a synchronous machine (1). The motor drive comprises control members adapted, to ensure the commutation, in connection with commutation of the machine-side converter (2), to switch the network-side converter (3) for operation with a lower pulse number than the natural pulse number of the network-side converter.

15 Claims, 14 Drawing Sheets

LOAD-COMMUTATED SYNCHRONOUS MOTOR DRIVE

TECHNICAL FIELD

The present invention relates to a load-commutated synchronous motor drive, which comprise a line-commutated network-side converter with dc terminals, and with ac terminals for connection to an alternating voltage network, and with a natural pulse number, a load-commutated machine-side converter with ac terminals for connection to a synchronous machine, and with dc terminals which are connected to the dc terminals of the network-side converter via a current-source dc intermediate link.

BACKGROUND ART

Synchronous motor drives of the kind described above are previously known from, for example, ABB Handbok Industri, Asea Brown Boveri AB Västeras 1993 (referred to in the following as "ABB Handbok"), pages 276–284, from IEEE Transactions on Industry Applications Vol. IA-19, No.2, March/April 1983 (referred to in the following as "IEEE"), pages 217–222, and from H. Bühler:"Einführung in die Theorie geregelter Drehstromantriebe", Birkhäuser, Basel-Stuttgart 1977 (referred to in the following as "Bühler"), e.g. Band I, pages 21–23; Band II, pages 88–158.

In a synchronous motor drive of the above type, the machine-side converter is of a line-commutated type, and the induced alternating voltage of the synchronous machine constitutes the commutating voltage of the converter. This voltage decreases with the frequency, that is, with the speed of the machine, but since the resistance in the commutating circuit is negligible in comparison with the reactance down to relatively low speeds, the commutating capability of the machine is not influenced in any practical sense. At very low speeds, however, the effect of the resistance is no longer negligible, and the commutating capability of the machine is then not sufficient for commutation of intermediate-link currents which are greater than the limiting current for discontinuous current.

To achieve commutation, also at very low machine speeds, of currents larger than the above-mentioned limiting current, that is, to make it possible to maintain the current and torque of the machine also at a very low speed, it is previously known from ABB Handbok, page 282, from IEEE, page 219, and from Bühler, Band 2, pages 92–93, to use so-called forced commutation operation. In this case, the intermediate-link current is reduced to zero with the aid of the network-side converter in connection with each commutation of the machine-side converter. Each such reduction, however, entails a loss of current-time area and hence a loss of torque—a torque disturbance (see, e.g. ABB Handbok, page 284, last paragraph). Moreover, these torque disturbances are reinforced by the speed regulator of the system, which increases its output in order to compensate for the loss of the torque-time area which is equivalent to the current-time area caused by the intermediate-link discontinuous current operation.

The torque disturbances occur with a frequency which is proportional to the machine frequency. It has proved that the frequency of the torque disturbances may typically coincide with a mechanical natural oscillation frquency of the drive system. This means that the torque disturbances will excite mechanical natural oscillations in the drive system. In such drive systems as are operating with a high current and a high torque at low speeds, these oscillations may become considerable, and the oscillations entail considerable disadvantages in the form of, for example, a high sound level, increased wear and a risk of mechanical damage. These disadvantages are particularly great in drive systems which are operating for lengthy periods at a critical speed, or which often pass through a critical speed range.

The sudden reduction and increase, respectively, of the current-time area when changing to and from, respectively, intermediate-link discontinuous current operation further entails an unfavourable discontinuity in the control properties of the system.

To ensure current commutation in a synchronous motor drive at low speeds, it has been proposed, as an alternative to intermediate-link discontinuous current operation, to short-circuit the smoothing inductor of the intermediate link, at each commutation in the machine-side converter, by firing a freewheeling thyristor valve connected in parallel with the inductor. This solution is mentioned, for example in IEEE, page 220, section IIIB. The loss of current-time area becomes lower with this method than with intermediate-link discontinuous current operation, but the torque disturbances will have a high amplitude also with this method. Further, it is required that the thyristor valve be dimensioned for full system voltage and taking into consideration the high intermediate-link current, which results in a high price and large dimensions of the valve.

SUMMARY OF THE INVENTION

The invention aims to provide a synchronous motor drive of the kind described in the introductory part of the description, in which the above-mentioned torque disturbances and the drawbacks caused thereby are greatly reduced or completely eliminated in a simple and advantageous way.

This is achieved by providing the motor drive according to the invention with control members adapted, in case of insufficient commutating capability of the synchronous machine, in connection with commutation of the machine-side converter, to switch over the network-side converter for operation with a lower pulse number than the natural pulse number of the converter, which makes it possible to avoid intermediate-link discontinuous current operation and the disadvantages thereof.

According to a preferred embodiment of the invention, the motor drive is provided with control members adapted, in connection with the commutations in the machine-side converter, and in dependence on the actual operating quantities of the machine, to determine whether the commutating capability of the machine is sufficient for commutation of the current in question and, if this is not the case, to execute the switching of the network-side converter to operation with a lower pulse number. According to one embodiment, this determination is made by calculating the maximum current which the machine is capable of commutating, and comparing this current with the actual current.

According to one embodiment of the invention, the network-side converter is designed for operation with a plurality of different pulse numbers which are lower than the natural pulse number. The system is then provided with control members adapted, in connection with commutation in the machine-side converter, to determine the highest of the pulse numbers which ensure commutation and to switch over the network-side converter for operation with this pulse number.

According to one embodiment of the invention, improved properties may be obtained by taking into account, when determining which pulse number of the network-side converter is to be used in connection with the commutation of the machine-side converter, the fact that also an insufficient machine voltage makes a contribution to the commutating capability.

BRIEF DESCRIPTION OF THE DRAWINGS

The invention will be described in greater detail in the following with reference to the accompanying FIGS. 1–10, wherein.

DESCRIPTION OF THE PREFERRED EMBODIMENTS

By the "natural pulse number" of a line-commutated converter is meant in this application the number of commutations per alternating-voltage period that the converter permits. Thus, a two-way single-phase bridge has the natural pulse number 2 and a two-way three-phase bridge the natural pulse number 6. A 12-pulse converter with two dc series-connected three-phase bridges, which are connected to three-phase systems displaced 30° between themselves, has the natural pulse number 12.

Figure 1A:
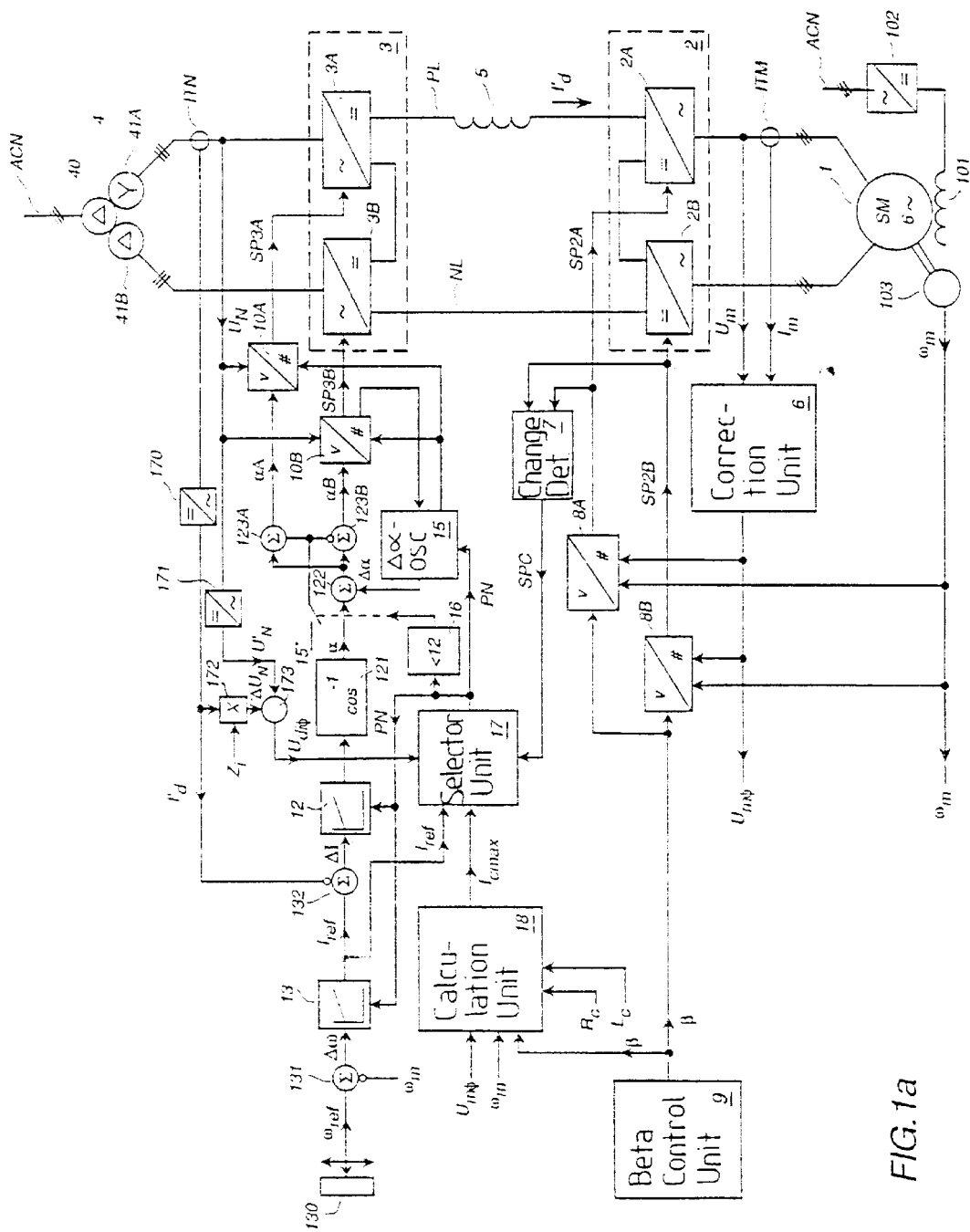
FIG. 1a is a block diagram showing an example of a synchronous motor drive according to the invention.

An example of a 12-pulse synchronous motor drive according to the invention is shown in the form of a block diagram in FIG. 1a. It comprises a 6-phase synchronous machine 1, the six ac terminals of which are connected to a machine-side converter 2 consisting of the two dc series-connected two-way 6-pulse three-phase bridges 2A and 2B. This converter, in turn, is connected to a dc intermediate link consisting of the busbars PL and NL and an intermediate-link reactor 5. The intermediate link is supplied with direct current $I_d$ from a network-side converter 3, which consists of the two dc series-connected three-phase bridges 3A and 3B. The latter are connected to a three-phase power network ACN via a converter transformer 4 with a delta-connected primary winding 40 and two secondary windings 41A and 41B, of which the former one is star-connected and the latter one delta-connected. The intermediate-link reactor 5 is preferably designed with a relatively high inductance to reduce interharmonic disturbances, partly in the torque of the machine, partly in the network.

Figure 1B:
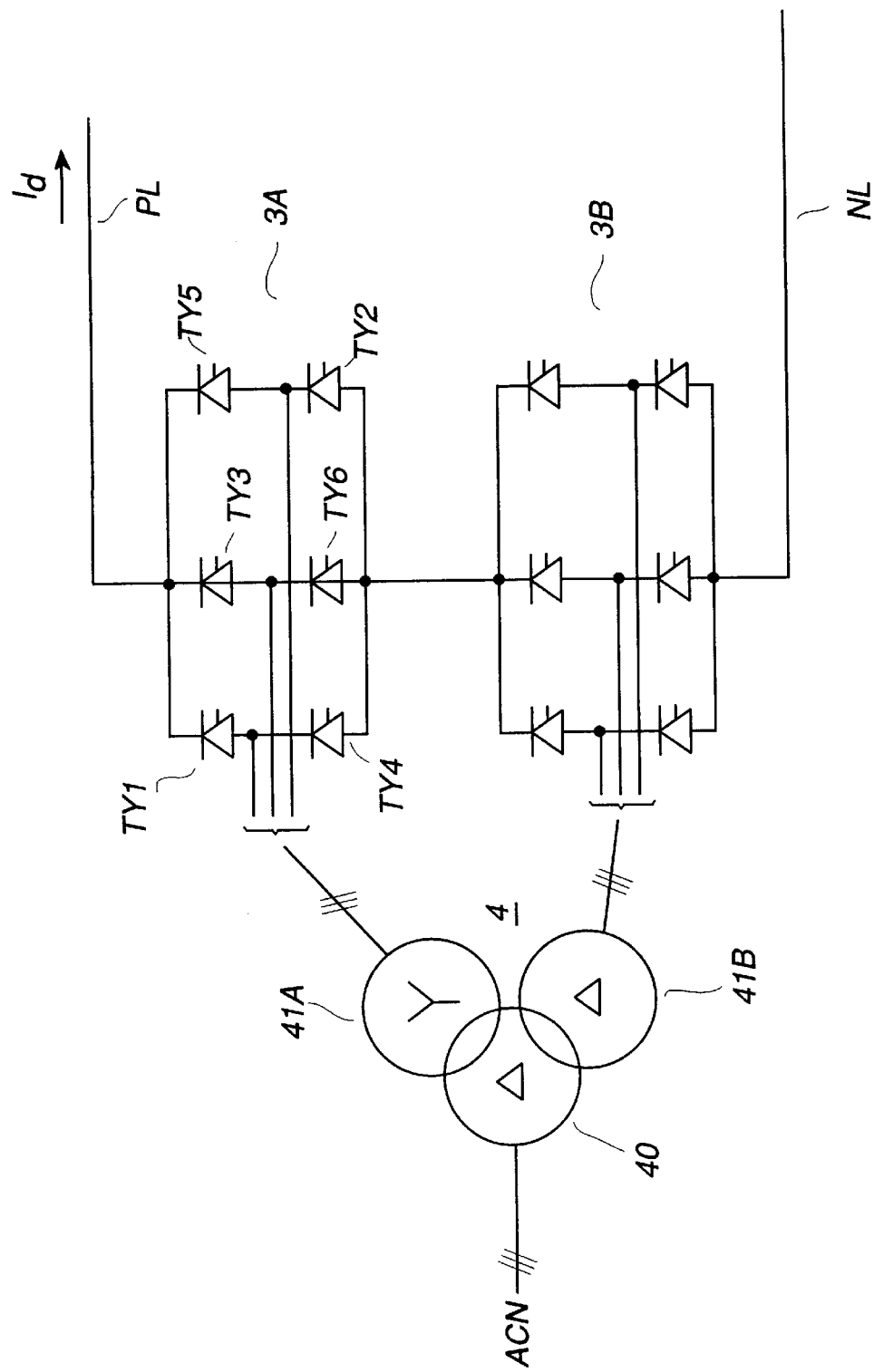
FIG. 1b shows the network-side converter in the motor drive according to FIG. 1a, FIG. 1c shows the machine-side converter in the motor drive according to FIG. 1a, FIG. 2 shows an example of the embodiment of the selector circuit for connection of the pulse number modulation and for switching between various pulse numbers.

FIG. 1b schematically shows the network-side converter 3 with the two thyristor bridges 3A and 3B. The bridges are dc series-connected and line-commutated. The bridge 3A is connected to the star-connected secondary winding 41A of the transformer 4, and the bridge 3B is connected to the delta-connected secondary winding 41B. Each bridge is a six-pulse two-way bridge. By the selected transformer connection, a phase displacement of 30° between the alternating voltages of the bridges is obtained, and the converter in its entirety is given the pulse number 12.

In the bridge 3A the numbering of the six thyristor valves TY1–TY6 of the bridge is stated. The corresponding valve numbering is used in the following also for the other bridges 3B, 2A and 2B in the intermediate-link converter.

Figure 1C:
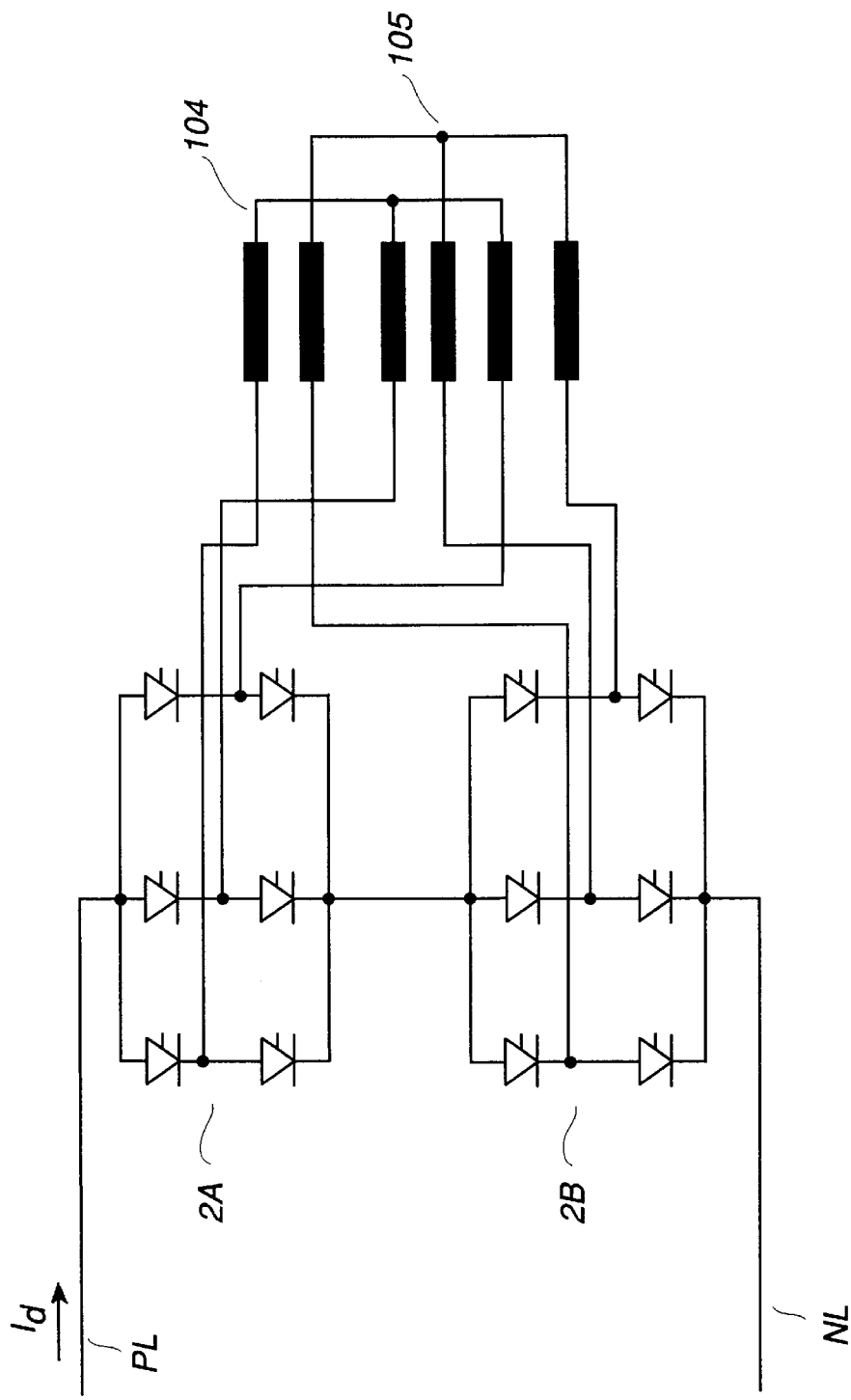

FIG. 1c schematically shows the machine-side converter 2 with the two three-phase bridges 2A and 2B. The bridges are dc series-connected and line-commutated. The synchronous machine 1 is of six-phase design and has two three-phase winding systems 104 and 105 which are displaced 30° between themselves. The three windings in the system 104 are connected to the alternating-voltage connections of the bridge 2A, and the three windings in the system 105 are connected to the alternating-voltage connections of the bridge 2B. Also this converter is in its entirety given the pulse number 12.

The valves of the two converters 2 and 3 consist of thyristor valves, equipped with conventional thyristors (i.e. thyristors which cannot be extinguished with the aid of a control signal). The commutating voltages of the converters consist, for the converter 2, primarily of the induced alternating voltage of the synchronous machine and, for the converter 3, of the alternating voltage in the network ACN.

The synchronous machine 1 has a field winding 101, and the field current is obtained from a controllable rectifier 102. Further, the machine has a tachometer generator 103, for example of pulse transducer type, which delivers a signal cm corresponding to the angular velocity of the machine. The terminal voltage $U_m$ and current $I_m$ of the machine are sensed, the latter with the aid of a current transformer ITM, and are supplied to a correction unit 6. In this, the measured signals are filtered and a signal $U_{m\phi}$ is generated, the amplitude and phase position of which correspond to the induced air-gap voltage of the machine. The unit 6 may be designed in the way described in the Swedish patent specification with publication number 415 425. A superordinate control unit 9 calculates a value of the firing angle β of the machine-side converter which is optimized to the prevailing operating conditions. The angle β is the distance in electrical degrees from the beginning of a commutation (by firing of the commutated thyristor) to the immediately following zero crossing of the commutating voltage. The desired firing angle β is supplied to the control pulse devices 8A and 8B of the machine-side converter. These control pulse devices determine, on the basis of the signals $U_{m\phi}$, β and $\omega_m$, the times for firing of the commutated thyristors and deliver firing pulses, SP2A and SP2B, to these thyristors with such a phase position in relation to the air-gap voltage of the machine that the firing angle is given the desired value β.

At each moment current flows in two of the three phase windings in each of the two winding systems 104 and 105. Which phase windings are current-carrying is determined at each moment by which thyristor valves are fired and are conducting. This can be viewed as if the control pulses to the valves of the machine-side converter 12 form a pattern which changes for each commutation but which is constant in between.

A change detector 7 is supplied with the control pulses SP2A and SP2B and senses changes in the above-mentioned control pulse pattern. Each change is an indication that a commutation is about to be started, and at each change a detection signal SPC is delivered. This signal activates the pulse number modulation according to the invention in a way which will be described in the following. The change detector may, for example, be designed with a 12-bit memory which stores a digital number which delivers the control pulse pattern. Continuously and at regular intervals, the control pulse pattern given by the control pulses SP2A, SP2B is compared with the stored pattern, whereupon the former pattern is stored in the memory. The comparison may be made as a simple subtraction, and if the result differs from zero, a signal SPC is delivered.

The network-side converter 3 controls the current in the main circuit. The alternating current $I_N$ to the bridge 3A is sensed with the aid of a current transformer ITN. In a rectifier 170, a measured value $I'_d$ is formed, which is proportional to the current $I_d$ and which is compared with a current reference $I_{ref}$ in a summator 132. The difference $\Delta I$ is supplied to a current regulator 12 with PI characteristic. The output signal of the regulator is supplied to a function generator 121 for linearization of the control circuit, the output signal of this generator being an arcuscosine function of the input signal and corresponding to the control angle $\alpha$ of the network-side converter. This signal is supplied via a summator 122 to the summators 123A and 123B, the output signals $\alpha_A$ and $\alpha_B$ of which constitute the control angles of the two bridges 3A and 3B of the converter 3. The latter signals are supplied to the control pulse devices 10A and 10B of the bridges. As phase-position reference, the control pulses are supplied with the sensed line voltage $U_N$. The control pulse devices deliver control pulses SP3A and SP3B to the valves of the two bridges with such phase positions in relation to the line voltage that the desired values $\alpha_A$ and $\alpha_B$ of the control angles of the bridges are obtained.

Figure 10:
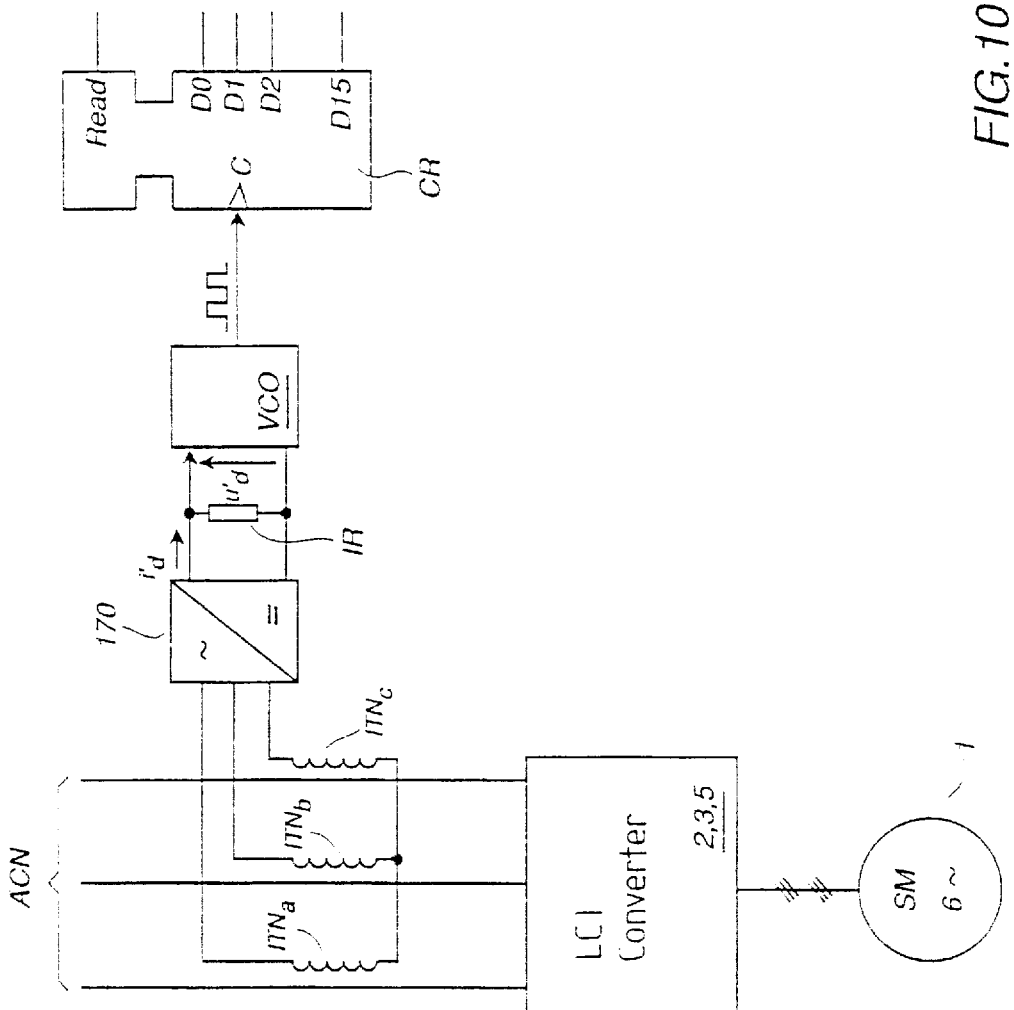
FIG. 10 shows in more detail how the current measurement is arranged in the converter according to FIG. 1.

FIG. 10 shows in more detail how the circuits for the current measurement are formed in the motor drive according to FIG. 1a. The current transformers ITNa, ITNb and ITNc are each arranged in a phase lead on the ac side of the converter. With the aid of the three-phase rectifier bridge 170, a measured direct current $i'_d$ is generated, the instantaneous value of which is proportional to the instantaneous value of the actual direct current id of the converter.

Across a resistor IR, the measured current generates a measured voltage $u'_d$ which is also proportional to the converter current id. The measured voltage controls a voltage-controlled oscillator VCO. This generates a pulse train in the form of a square signal, the frequency of which is proportional to the voltage of the input of the VCO circuit. The square signal is supplied to the input of a means CR for counting up which has data outputs D0–D15. The counter calculates pulses until the value of the outputs D0–D15 becomes FFFF, whereafter the counter is automatically reset and restarted.

At intervals coinciding with the commutating intervals, the counter register is read. The change of the counter contents during an interval is then proportional to the current Id. By reading also the length of the measurement interval during the reading, a measured signal $I'_d$ may be formed, which is proportional to the mean value $I_d$ of the converter current during the measurement interval.

Figure 9:
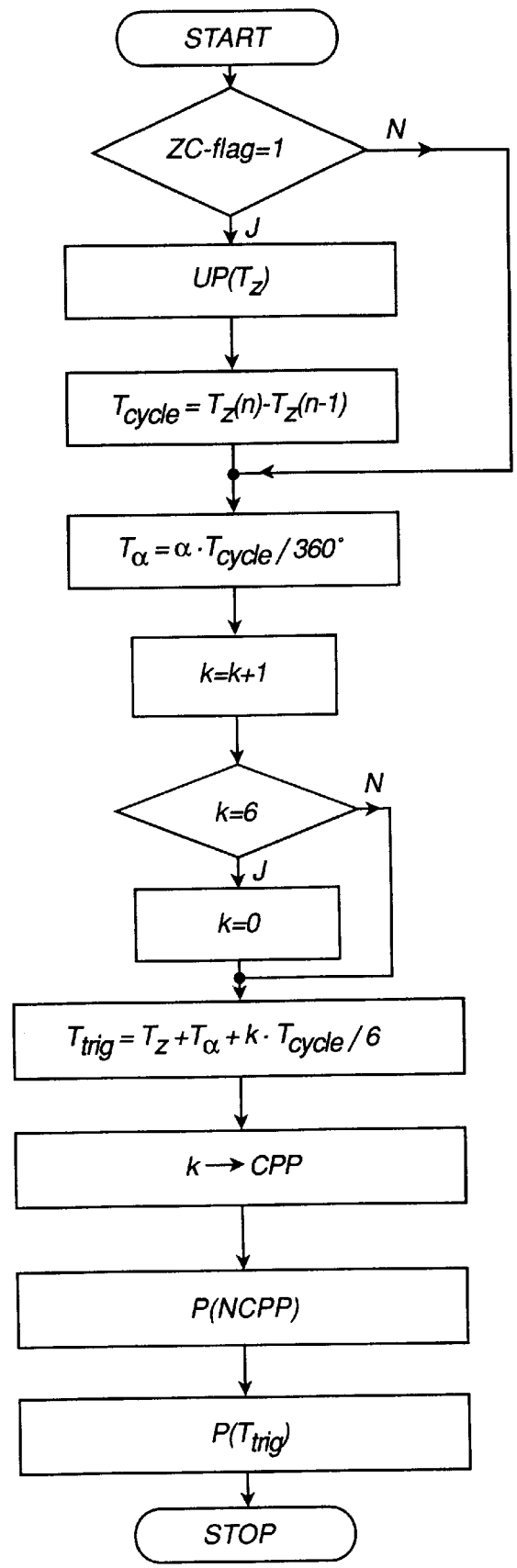
FIG. 9 shows the principle of generation of control pulses for the network-side converter in FIG. 1.

Control pulses are generated according to the principle shown in FIG. 9. As phase-position reference there is used the zero crossing of one of the phase voltages on the network side of the converter. This zero crossing ZC is detected by a comparator and is marked on a time axis, $T_{ZC}$. This event also sets a memory circuit to one, ZC-flag.

When the control program, which is here assumed to be implemented in a microprocessor, discovers that the circuit ZC-flag is set to a one (block "ZC-flag=1"), a mains synchronization routine is completed. This uses $T_{ZC}$ to calculate the time $T_Z$ for commutation of the thyristors Ty1 and Ty6 (i.e. k=0, see table below) at the control angle a=0. This updating of $T_Z$ is done in the block "UP($T_Z$)". That phase-to-phase voltage which has then become commutated is represented by the fact that the voltage vector k has the value zero. The voltage vector k corresponds to a control pulse pattern according to the pattern:

| Control pulse pattern | | | | | | Voltage vector |
|---|---|---|---|---|---|---|
| Ty1 | Ty2 | Ty3 | Ty4 | Ty5 | Ty6 | k |
| 1 | 0 | 0 | 0 | 0 | 1 | 0 |
| 1 | 1 | 0 | 0 | 0 | 0 | 1 |
| 0 | 1 | 1 | 0 | 0 | 0 | 2 |
| 0 | 0 | 1 | 1 | 0 | 0 | 3 |
| 0 | 0 | 0 | 1 | 1 | 0 | 4 |
| 0 | 0 | 0 | 0 | 1 | 1 | 5 |

During the mains synchronization routine (block "$T_{cycle}= T_Z(n)-T_Z(n-1)$") also the period $T_{cycle}$ of the network is calculated from the difference between the latest value of $T_Z$, namely, $T_Z(n)$, and the latest value but one, $T_Z(n-1)$.

In connection with each commutation, the period is used to convert the control angle a into a delay time $T_\alpha$ (block "$T_\alpha = \alpha \cdot T_{cycle}/360°$"). Each time the control pulse device is run, the quantity k is incremented by 1 in block "k=k+1".

The incrementation is run until k=6, whereupon k is reset (blocks "k=6" and "k=0"). Each time the control pulse device is run, the voltage vector is thus also updated. For each commutation which is made, the reference time $T_Z + k \cdot T_{cycle}/6$ is advanced by a time corresponding to 60°.

Thus, a time $T_{trig}$ for the next commutation is calculated (block "$T_{trig} = T_Z + T_\alpha + k \cdot T_{cycle}/6$"). Further, the voltage vector k is translated into a control pulse pattern (block "k–CPP"). This control pulse pattern is written out into a memory circuit (block "P(NCPP)".

Immediately thereafter, a timing circuit is activated by the time $T_{trig}$ (block "P($T_{trig}$)"). When this time has expired, the control pulse pattern is moved to a new memory circuit which is connected to the control inputs of the thyristors.

This time, that is, $T_{trig}$, may be used to determine the starting time for the calculation of the next commutation and so on. When controlling a series converter (two series-connected 6-pulse converters), two control angles are used, $\alpha_{master}$ and $\alpha_{slave}$. During 12-pulse operation, the values of these two control angles are identically alike.

For certain pulse numbers, for example PN<6, k is incremented by a number which is greater than one.

A speed reference $\omega_{ref}$ is obtained from a reference value transducer 130, for example a potentiometer, or from a superordinate control system. The speed reference is compared in a summator 131 with the speed signal $\omega_m$ obtained from the tachometer generator 103, and the difference is supplied to a speed regulator 13 with PI characteristic. The output signal of this regulator constitutes the above-mentioned current reference $I_{ref}$.

The sensed line voltage $U_N$ is rectified in a measurement rectifier 171, the output signal $U_N'$ of which corresponds to the amplitude of the line voltage. In a multiplier 172 the sensed current $I'_d$ is multiplied by a quantity $Z_i$ which corresponds to the internal impedance of the network ACN including the impedance of the transformer 4. The product $\Delta U_N$ is added in a summator 173 to the signal $U_N'$, and the resultant signal $U_{di\phi}$ is a measure of the open-circuit voltage of the network. The signal is supplied to a selector circuit 17, the function of which will be described below.

In a calculating circuit 18, the highest commutatable current $I_{Cmax}$ is continuously calculated. This depends on the calculated air-gap voltage $U_{m\phi}$ of the machine and the measured frequency $\omega_m$ of the machine. Further, it is dependent on the firing angle $\beta$ of the machine-side converter. At the low speeds when the commutating capability may become insufficient, this angle is normally set at a constant maximum value, for example 52°, which is chosen taking into account the power factor of the motor, the reason being to obtain the highest possible commutating capability. The other parameters which determine the commutating capability, namely, the commutating resistance per phase $R_C$ and the commutating inductance per phase $L_C$, are treated during the calculation as as constants and are determined from factual data of the main circuit—machine, converter, cables.

A commutation of the current from, for example, the thyristor TY4 to the thyristor TY6 in a bridge in the machine-side converter is started by firing the thyristor TY6. The commutating voltage, that is, the difference between the phase voltages connected to these thyristors, drives an increasing commutating current $i_k$ through the commutating circuit which consists of the two thyristors and the phase windings, connected thereto, of the machine. Through the decommutated thyristor TY4 the resultant current $i_d - i_k$ flows, and through the commutated thyristor TY6 the current $i_k$ flows. When $i_k$ has risen to the value $i_d$ the thyristor TY4 expires and the commutation is completed.

At the low frequencies occurring, the resistance in the commutating circuit cannnot be neglected, but during the calculation both this resistance and the commutating inductance must be taken into consideration.

The commutating process takes a certain amount of time which corresponds to the so-called overlap angle $\mu$. This angle must not exceed a certain maximum value determined by the firing angle $\beta$ in order for a commutation to succeed. This condition is $$\mu < \beta - \gamma$$

where

| | |
|---|---|
| $\gamma = \omega_m t_q$ | during 6-pulse operation |
| $\gamma = \beta - \pi/6 + \omega_m t_q$ | during 12-pulse operation |

The reason for the different values at the two pulse numbers is that during 12-pulse operation, the commutating notches n the voltage are inductively coupled between the two three-phase systems.

The recovery time of the thyristor valves is typically 400 $\mu$s, and at the low machine frequencies occurring, the term $\omega_m t_q$ primarily be omitted. At an assumed value of the firing angle $\beta = 52°$, the values which must not be exceeded by the overlap angle $\mu$ are then obtained:

| | |
|---|---|
| 52° | during 6-pulse operation |
| 30° | during 12-pulse operation |

The relationships which apply as regards the commutating capability of a synchronous machine at low frequency are described in, for example, Bühler, Band I, pages 155–159. The calculation of the current $I_{Cmax}$ ($I_k$ in Bühler) is suitably made with the aid of the relationship 3.32b on page 158 in Bühler, Band I, and is preferably carried out with an appropriately programmed microprocessor.

Figure 2:
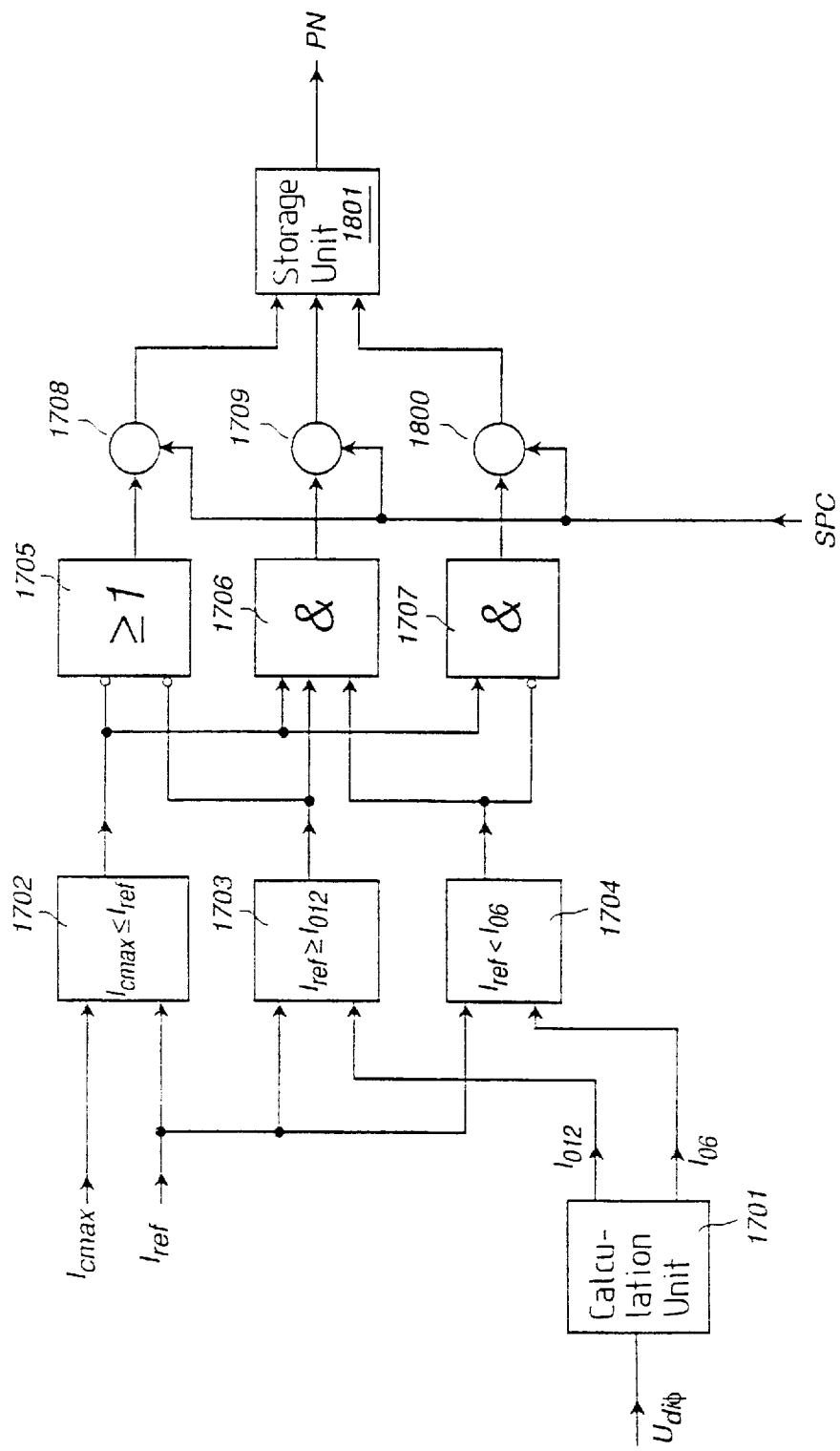

The selector circuit 17 is composed in the manner shown in FIG. 2. A calculating circuit 1701 calculates the limiting currents for discontinuous operation at different pulse numbers: $I_{012}$ during 12-pulse operation and $I_{06}$ during 6-pulse operation. These limiting currents are dependent, in a known manner, on the constant data of the main circuit, primarily on the inductance of the smoothing inductor 5, on the pulse number of the network-side converter, and on the open-circuit voltage $U_{v0}$ of the network ACN, here represented by its rectified equivalence $U_{di\phi}$. In comparison circuits 1702, 1703, 1704 the current reference $I_{ref}$ is compared with $I_{Cmax}$, $I_{012}$ and $I_{06}$. The circuit 1702 delivers an output signal if $I_{Cmax} \leq I_{ref}$, the circuit 1703 an output signal if $I_{ref} \geq I_{012}$ and the circuit 1704 an output signal if $I_{ref} < I_{06}$.

The output signals from the circuits 1702, 1703, 1704 are supplied to an OR circuit 1705 and to two AND circuits 1706 and 1707. The output signals from these circuits are supplied, in turn, to a memory circuit 1801 via switching members 1708, 1709, 1800 activated by the activating signal SPC.

The OR circuit 1705 delivers an output signal if $I_{Cmax} > I_{ref}$ and/or if $I_{ref} < I_{012}$. In the presence of the activating signal SPC, the output signal of the circuit 1705 is forwarded to the memory circuit 1801, where it causes storage of a value corresponding to 12 in the pulse number PN. The AND circuit 1706 delivers a signal if $I_{Cmax} \leq I_{ref}$ and at the same time $I_{ref} \geq I_{012}$ and $I_{ref} < I_{06}$. In the presence of the activating signal SPC, the output signal of the circuit 1706 is forwarded to the memory circuit 1801, where it causes storage of a value corresponding to 6 of the pulse number PN. The AND circuit 1707 delivers an output signal if $I_{Cmax} \leq I_{ref}$ and at the same time $I_{ref} > I_{06}$. In the presence of the activating signal SPC, the output signal of the circuit 1707 is forwarded to the memory circuit 1801, where it causes storage of a value corresponding to 3 of the pulse number PN.

The output signal PN from the selector circuit 17 thus continuously constitutes a measure of the desired pulse number with which the network-side converter is to operate during the next commutating process in order that the current in question shall be commutated with certainty. It is updated by the signal SPN at the beginning of each commutation. The signal PN is supplied to a circuit 16, which, if PN<12, causes switching of a signal corresponding to 15° to the summators 123a and 123B.

If PN=12, then $\alpha_A = \alpha_B = \alpha$. The network-side converter then operates with both its bridges mutually displaced in phase 30°, with a commutation every 60° in each bridge and with a commutation every 30° in the converter it is entirety, that is, in 12-pulse operation. On the other hand, if PN<12, then $\alpha_A = \alpha + 15°$ and $\alpha_B = \alpha - 15°$. This causes the commutations of the bridge 3A to occur 15° later and the commutations of the bridge 3B to occur 15° earlier. In each bridge a commutation occurs every 60° as during 12-pulse operation, but the commutations will occur simultaneously in the two bridges. For the converter as a whole, the intervals between the commutations will be 60°, that is, the converter operates in 6-pulse operation.

The value PN=3 activates a Δα-oscillator 15. This is synchronized to the control pulse devices 10A and 10B of the network-side converter. Immediately before each new commutating time is to be determined, the oscillator changes its output signal from +30°0 to −30° and some time after the commutation the output signal is changed back to +30°. Further, only every other thyristor pair is fired whereas the firings of the intermediate thyristor pairs are omitted. There will therefore be 120° between consecutive commutations in the network-side converter, that is, it operates in 3-pulse operation.

When the pulse number is reduced, the speed of execution for the current control circuit is changed. A lower pulse number thus means, for example, lower intervals between the up-grades of the current response. The signal PN is therefore supplied also to the speed regulator 13 and the current regulator 12, for adaptation of the characteristic of the regulators (time constant and reinforcement) to the pulse number in question.

Figure 3A:
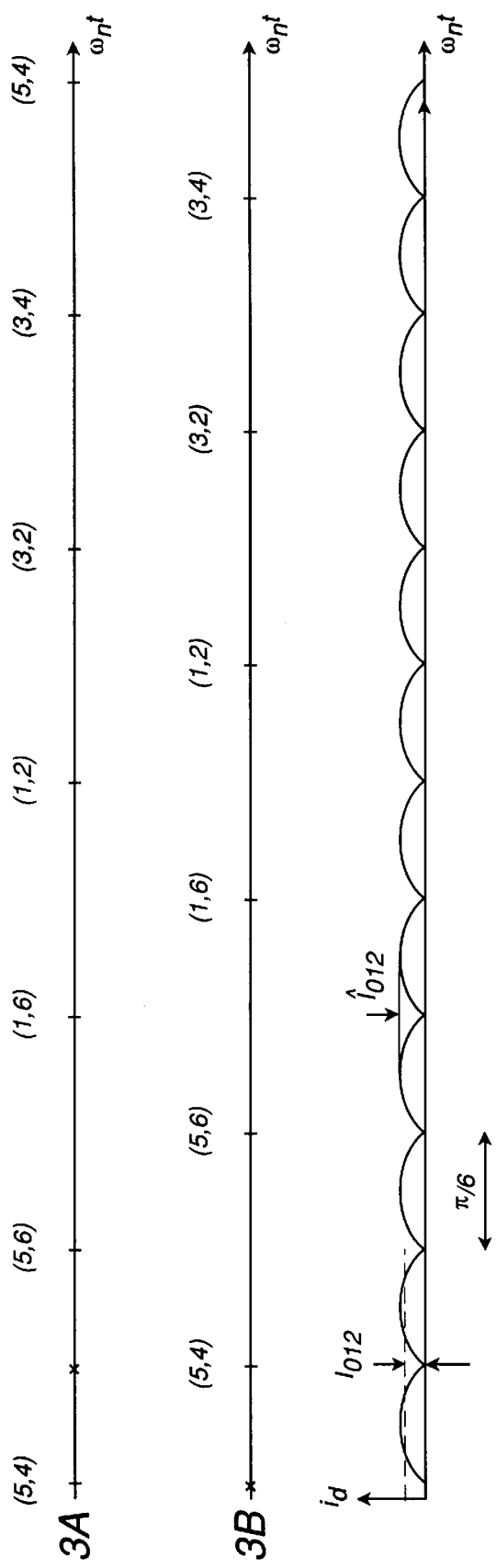
FIGS. 3a, 3b and 3e show commutating times and intermediate-link current for 12-pulse, 6-pulse and 3-pulse operation of the network-side converter.

The top graph in FIG. 3a shows the commutating times during normal 12-pulse operation during one cycle of the line alternating voltage $U_N$ of the two bridges 3A and 3B in the network-side converter 3. The commutating times are displaced 30° between the bridges 3A and 3B. The combinations of figures given in conjunction with the commutating times designate that thyristor pair which is to carry current during the following 60° interval.

Below this the intermediate-link current $i_d$ is shown. A ripple is superimposed on the intermediate-link current.

This ripple has the fundamental frequency 12 times the mains frequency. Its peak-to-peak value is $\hat{I}_{012}$ and is substantially determined by the open-circuit voltage $U_{di\phi}$ of the network ACN, by the inductance of the intermediate-link inductor 5, and by the pulse number of the network-side converter. The mean value of the intermediate-link current is assumed in the figure to be at the limiting current $I_{012}$ to discontinuous operation, that is, the minimum value of the current barely reaches down to zero during each commutation. For intermediate-link currents lower than the value $I_{012}$ the intermediate-link current and hence the current through the thyristors of the machine-side converter will be zero 12 times per line alternating voltage cycle, and, therefore, no commutating problems arise.

Figure 3B:
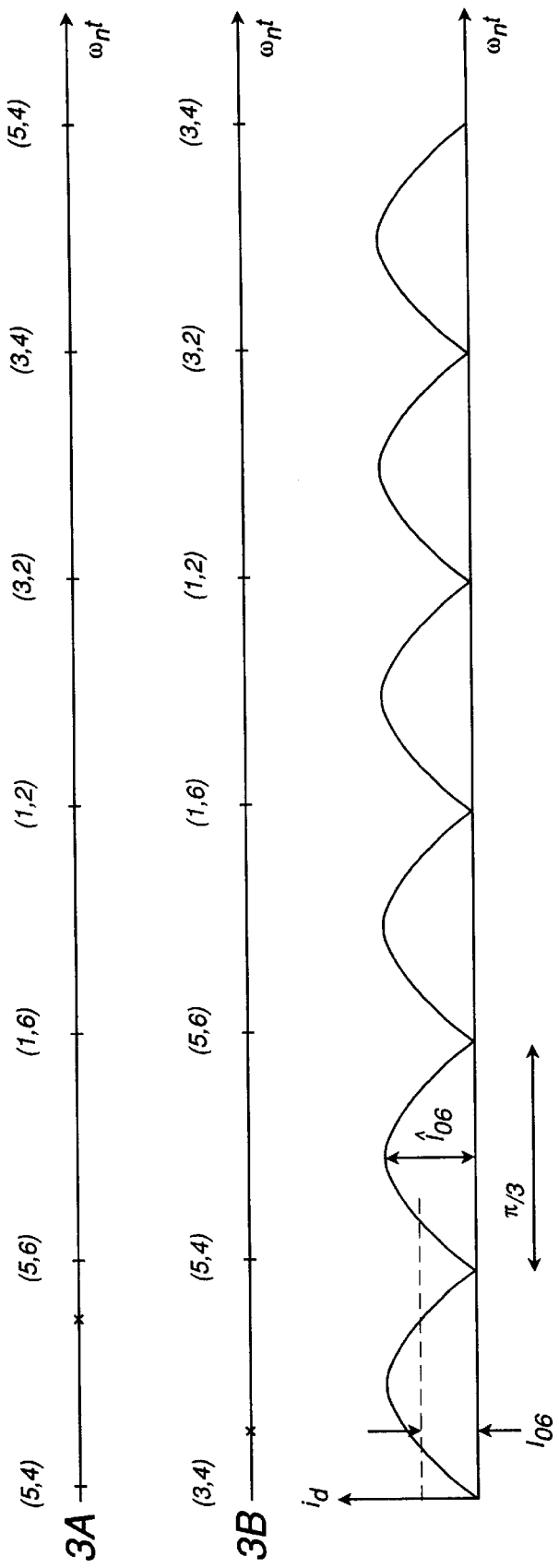

FIG. 3b shows the same quantities during 6-pulse operation. Since the commutations in the bridge 3A have been retarded by 15° and in the bridge 3B advanced by 15°, they will become synchronous in the two bridges. The network-side converter therefore operates in 6-pulse operation, and the frequency of the ripple will be half as high as during 12-pulse operation and the peak-to-peak value $\hat{I}_{06}$ will be higher. Also in this case, the mean value of the intermediate-link current is assumed to lie at the limiting current—$I_{06}$—between continuous and discontinuous operation. For intermediate-link currents lower than the value $I_{06}$ the intermediate-link current and hence the current through the thyristors of the machine-side converter will be zero 6 times per line alternating voltage cycle, and, therefore, no problems with the commutation of the machine-side converter arise.

Figure 3C:
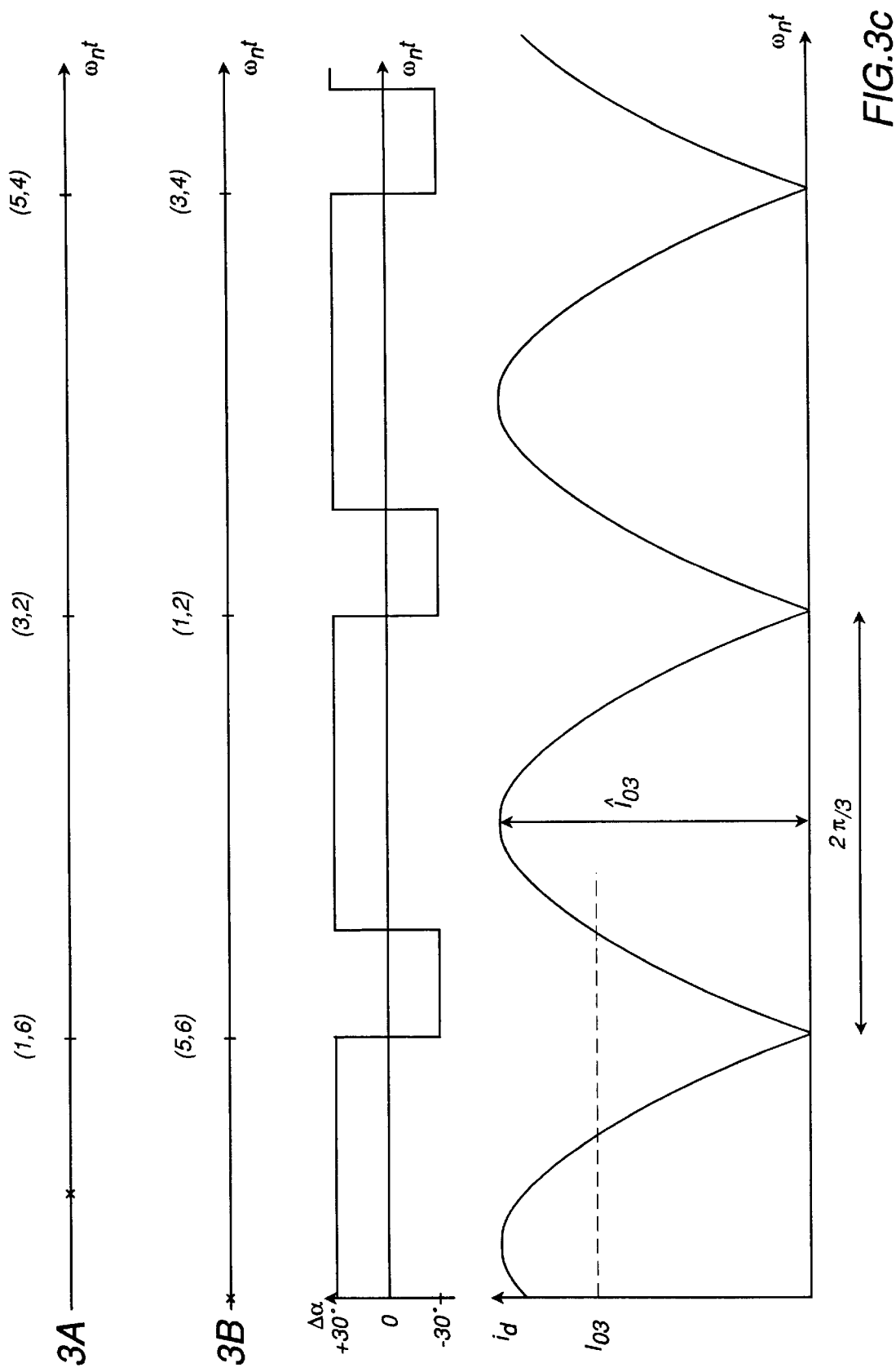

FIG. 3c shows the same quantities during 3-pulse operation. Below the two graphs, showing the commutating times for the bridges, it is shown how the quantity Δα varies with the time of the oscillator 15. The network-side converter operates in 3-pulse operation, and the frequency of the ripple will be one-fourth of the frequency during 12-pulse operation and a high peak-to-peak value $\hat{I}_{03}$ of the ripple is obtained. Also in this figure, the mean value of the intermediate-link current is assumed to lie at the limiting current—$I_{03}$—between continuous and discontinuous drive. For intermediate-link currents lower than the value $I_{03}$ the intermediate-link current and hence the current through the thyristors of the machine-side converter will be zero 3 times per line alternating voltage cycle, and, therefore, no problems with the commutation of the machine-side converter arise.

In the embodiment of a synchronous motor drive according to the invention, described above, both converters, as will be clear from the above, are operating in normal 12-pulse operation if the current is lower than the maximum commutatable current $I_{Cmax}$ at the motor speed in question. The machine-side converter is then commutated by the induced voltage of the machine. Likewise, the converters are operating in normal 12-pulse operation if the current is lower than the limiting current during 12-pulse operation $I_{012}$. In this case, zero crossings of the current are obtained because of the ripple generated by the network-side converter, and during these zero crossings, all the conducting thyristor valves in the machine-side converter expire.

At higher speeds the machine-side converter is commutated by the air-gap voltage of the machine. At decreasing motor speeds, however, this voltage decreases, and the commutating capability is reduced, which is reflected by a decreasing value of the quantity $I_{Cmax}$. If this is lower than the motor current, the network-side converter is switched to such a lower pulse number that the current, because of the ripple which increases greatly with decreasing pulse number, becomes discontinuous, whereby commutations in the machine-side converter can be made. As will be clear from FIG. 3, this makes it possible to handle high currents also at the lowest speed of the machine without any risk of commutating faults in the machine-side converter.

Figure 4:
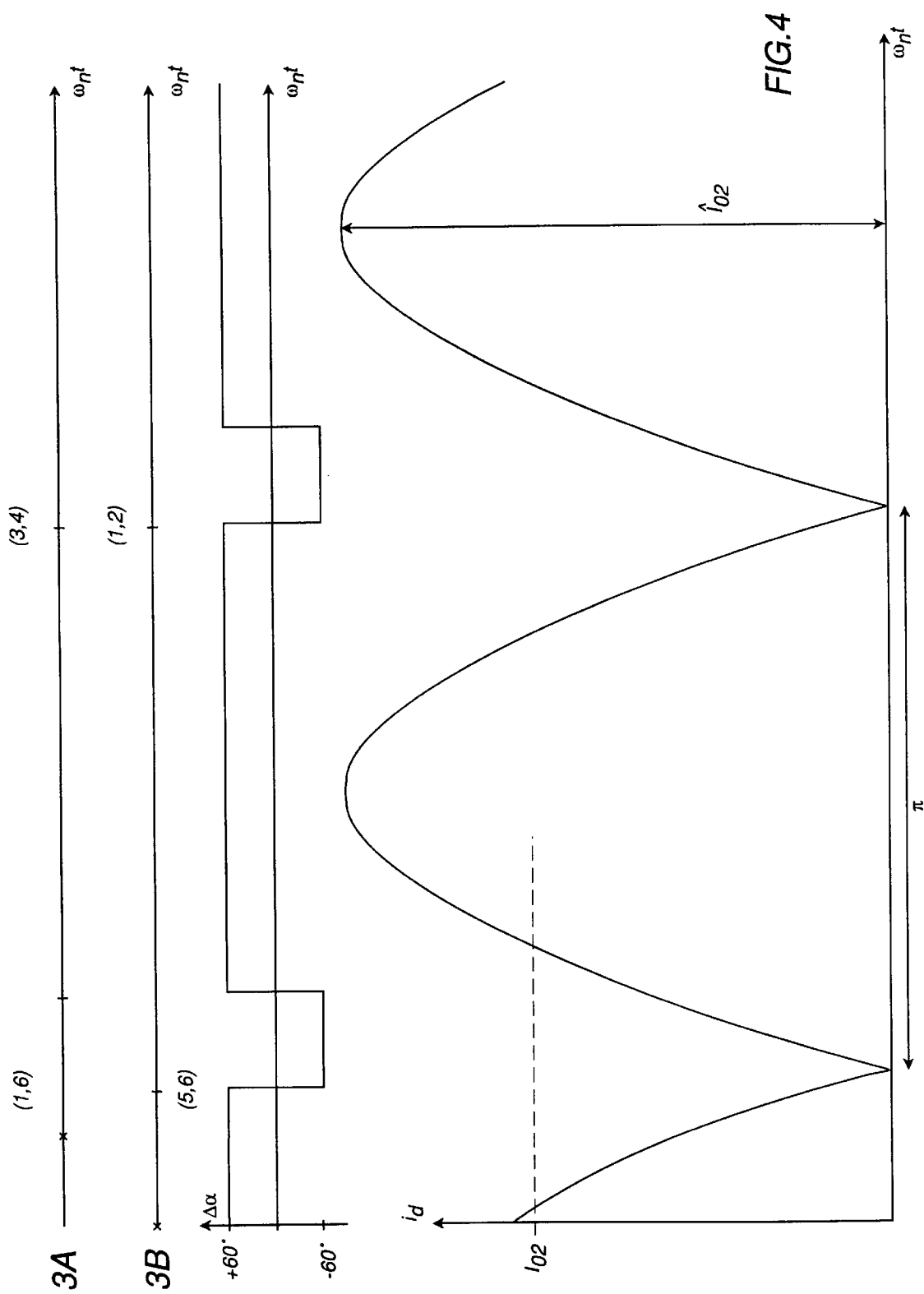
FIG. 4 shows how 2-pulse operation of the network-side converter may be achieved.

In the above-described synchronous motor drive, the lowest possible pulse number of the network-side converter is 3. If desired, still higher currents and/or still lower machine speeds may be handled by providing the system with a possibility of a further reduction of the pulse number. Thus, for example, the pulse number 2 may be obtained in the same way as the pulse number 3, that is, with the aid of an oscillating control angle. By increasing the amplitude of this oscillation from 30° to 60° and by only firing every third thyristor pair, 2-pulse operation of the network-side converter and a limiting current $I_{02}$ which is considerably higher than the limiting current during 3-pulse operation are obtained. FIG. 4 illustrates this and shows the same quantities as FIG. 3c.

It is also possible to synthetize even longer pulse numbers than 2, thus being able to handle still higher currents at a low machine speed. The largest pulse which can be realized without changing voltage arcs (i.e. without commutation from one to another phase-to-phase voltage) is 210° long, which results in the pulse number 1⁵⁄₇. This can be achieved by alternating the sign of the control angle offset of 15°, activated by the circuit 15 above, between the current pulses and by further increasing the quantity Δα, namely to 75°.

Pulse numbers other than those mentioned above may also be realized, for example by the introduction of extra commutations and/or by omitting commutations in other ways than those described above.

Figure 5:
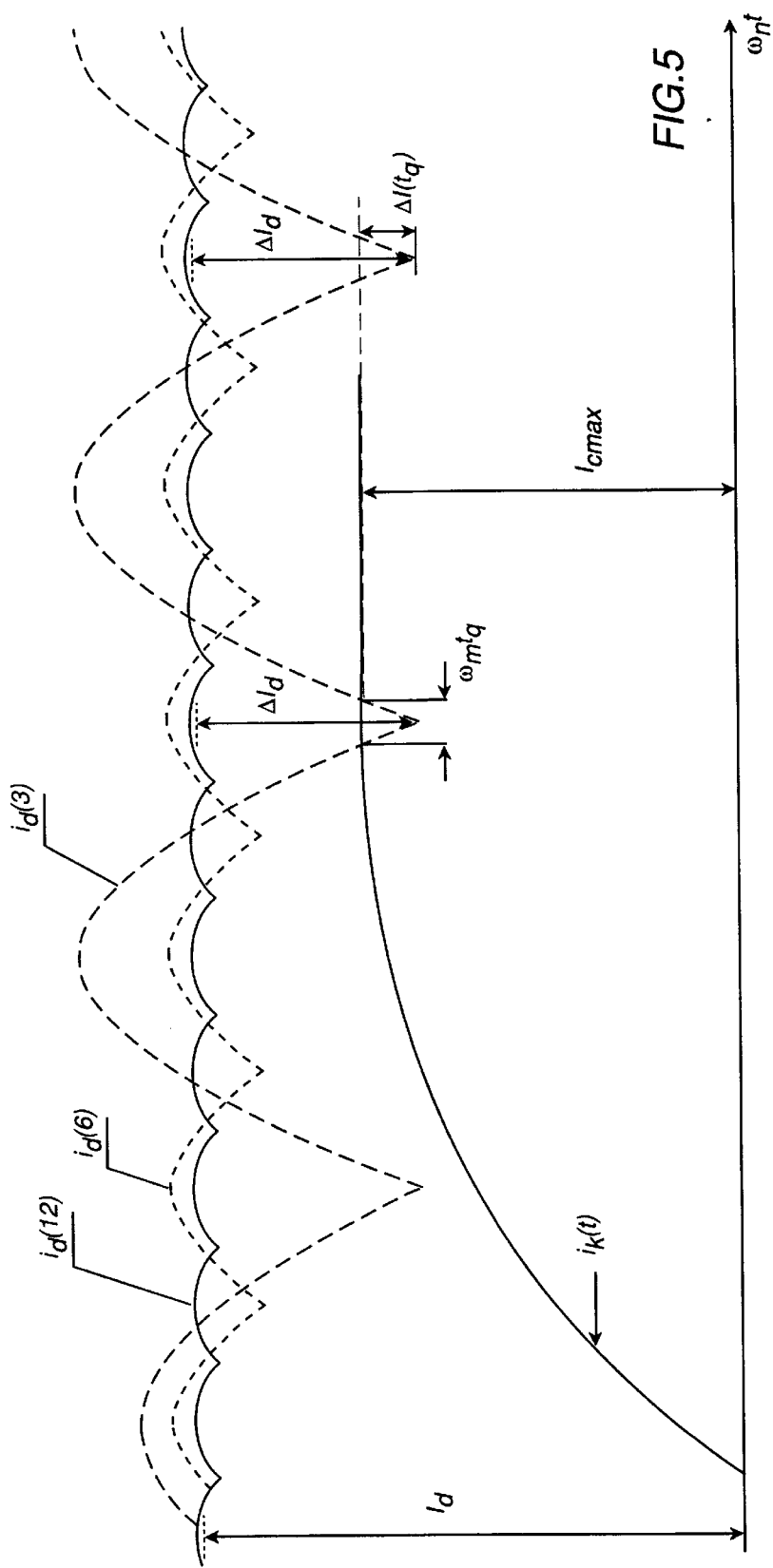
FIG. 5 shows the function of an alternative embodiment of the invention, where the commutating capability of the machine, and also the recovery time of the thyristor valves, are taken into account when determining the pulse number during operation with a reduced pulse number.

In the system according the invention described above, it has been assumed that since, at low speed and high current, the commutating capability of the machine is insufficient and a change to a lower pulse number has been made, the commutations are executed only with the aid of the ripple in the intermediate-link current. The fact that the machine always, as long as it rotates, has a certain commutating capability, even at the lowest speed, has not been taken into account. The commutating capability of the machine is represented by the value of the signal $I_{Cmax}$. This indicates by which amount the commutating current $i_k(t)$ increases in the time represented by the overlap angle $\mu$; for example, during 12-pulse operation and a machine frequency of 1 Hz, the angle $\mu=30°$ represents the time 83 ms. According to one embodiment of the invention, the commutating capability of the machine is taken into account, an unnecessarily large reduction of the pulse number of the network-side converter thus being avoided. FIG. 5 illustrates the function. The figure shows as functions of time and for an intermediate-link current $I_d$:

the instantaneous values of the intermediate-link current during
12-pulse operation $i_d(12)$
6-pulse operation $i_d(6)$
3-pulse operation $i_d(3)$
the commutating current $i_k(t)$ during an assumed commutating process in the machine-side converter.

The commutating current $i_k(t)$ grows to a value $I_{Cmax}$ which constitutes the commutating capability of the machine. The figure is made while assuming that a reduction of the pulse number to 6 is insufficient and a reduction to the pulse number 3 is barely sufficient for the current in question to be able to be commutated. The minimum value of the current $i_d(3)$ falls short of the mean value $I_d$ by the amount $\Delta I_d$. If the recovery time of the thyristors is not taken into consideration, the condition for commutation is $$Id \leq I_{Cmax} + \Delta I_d$$

where $\Delta I_d$ depends on the open-circuit voltage of the network and on the pulse number in question.

The recovery time $t_q$ of the thyristors is suitably taken into consideration, and this is done by reducing $\Delta I_d$ by an amount $\Delta I(t_q)$ so large (see the figure) that a zero-current interval of the duration $t_q$ is obtained. The commutation condition will then be $$Id \leq I_{Cmax} + \Delta I_d - \Delta I(t_q)$$

5 where also $\Delta I(t_q)$ depends on the open-circuit voltage of the network and on the pulse number in question.

Figure 6:
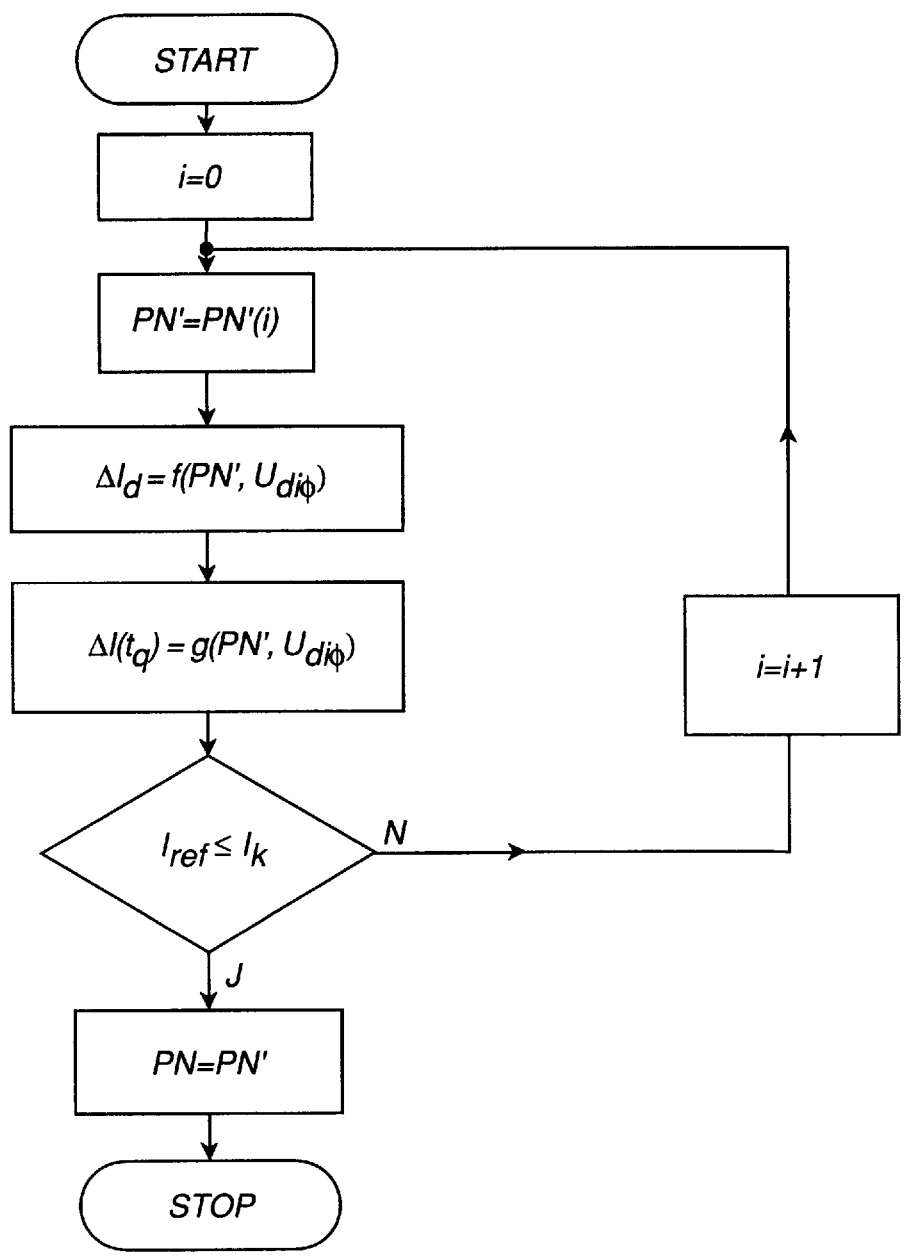
FIG. 6 shows in the form of a flow chart how the selector circuit may be designed to achieve the function according to FIG. 5.

The selector unit 17 in this case preferably consists of a processor adapted to carry out the necessary calculations and to investigate whether the commutation condition is fulfilled. The processor can thereby be programmed to operate according to the flow chart in FIG. 6. The processor is supplied with the signals shown in FIG. 2, where $I_{ref}$ represents the intermediate-link current Id, and is activated at the beginning of, or immediately before, each commutation in the machine-side converter by the signal SPC. The processor operates with a parameter "i" which, for example, may assume the values 0, 1, 2, . . . whereby a possible value of an assumed value PN' of the pulse number of the network-side converter corresponds to each value of "i", and where PN' depends on the variable "i" according to a prestored table, for example

| i | PN' = PN'(i) |
|---|---|
| 0 | 12 |
| 1 | 6 |
| 2 | 3 |
| 3 | 2 |

After starting, i is set at i=0. PN'=PN'(i) is fetched from the table. The quantities $\Delta I_d$ and $\Delta I(t_q)$ are calculated. Then the comparison is made between $I_{ref}$ and $I_k$, where $I_k = I_{Cmax} + \Delta I_d - \Delta I(t_q)$. If $I_{ref} > I_k$, the current in question cannot be commutated at the pulse number 12, and the variable "i" is increased by 1, whereupon a new calculation and a new comparison are made, this time with PN'=6. The process is repeated with successively lower pulse numbers until the commutation condition $I_{ref} < I_k$ is fulfilled. Then the output signal PN is set at PN=PN' and the calculation is terminated.

In the cases described above, the pulse number modulation is activated in connection with a commutation of the machine-side converter being ordered. Alternatively, the activation cannot be made until the commutating current has grown a certain distance. The overlap angle $\mu$ is known or may be calculated by the calculating circuit 18. It may be suitable to activate the pulse number modulation, that is, where necessary, reduce the pulse number of the network-side converter so far that the commutation of the machine-side converter is ensured, a time corresponding to the overlap angle after the start of the commutation, or somewhat earlier. The pulse number which is reduced where necessary may be applied for a time which depends on the motor frequency and the pulse number in question. It may, for example, be sufficient to operate with the reduced pulse number for about 10 ms at PN=6 and for about 20 ms at PN=3.

The pulse-number modulation, according to what has been pointed out above, is not activated the whole time during operation in the low-speed range, where the commutating capability of the machine is reduced. Depending on the embodiment, it is possible, as pointed out above, to activate the pulse-number modulation in connection with the commutation in the machine-side converter starting, or alternatively somewhat delayed.

The maximum value of the overlap angle is known and, as pointed out above, corresponds to a time (83 ms at 1 Hz) which is considerably greater than the time of a "current bubble" (i.e. the time between two commutations) of the network-side converter (during, e.g. 3-pulse operation and 50 Hz power frequency, this time is 6.6 ms). To ensure the commutation, it is suitable to allow a few pulse-number-modulated current bubbles to be, for example, 3. With the pulse number PN=this corresponds to 20 ms at 50 Hz power frequency. When the commutation in the machine-side converter has started, there is thus a delay of 83−20=63 ms before the pulse-number modulation is activated.

Figure 7:
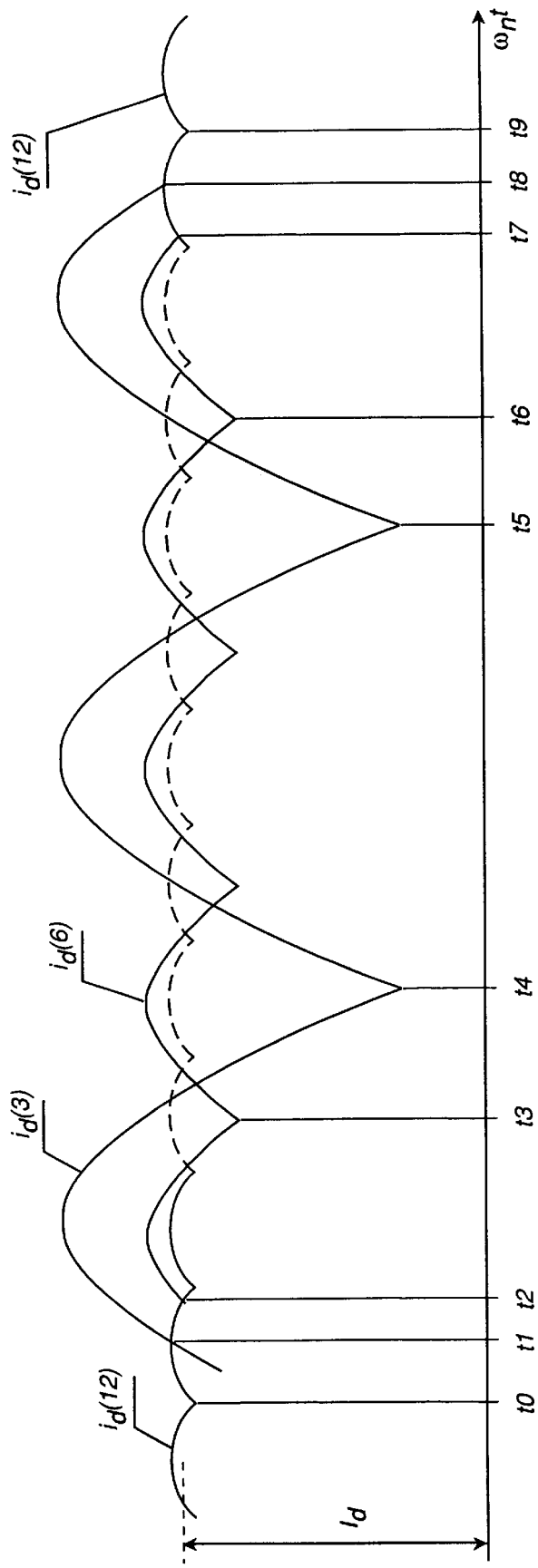
FIG. 7.

The activation—the switch to 3-pulse operation—is assumed to occur at the time t=t0 in FIG. 7. Before this time, the network-side converter operates in stationary 12-pulse operation and the intermediate-link current is $i_d(12)$. At t=t1 the first commutation is made in 3-pulse operation, and the time is so chosen that the first peak value of the intermediate-link current $i_d(3)$ in 3-pulse operation will have the same value as during stationary 3-pulse operation. The following commutations in 3-pulse operation are made at t4 and t5. At t8 such a commutation is made that a return to 12-pulse operation occurs, and this time is so chosen that the intermediate-link current directly changes to the course—$i_d$ (12)—it has during 12-pulse operation. At t9 the first ordinary commutation is then made in 12-pulse operation. During the intervals t0–t4 and t5–t9 there is thus no change from 12-pulse operation to 3-pulse operation and vice versa, and the network-side converter may be said to operate in transient 3-pulse operation. During the interval t4–t5 the converter is operating in stationary 3-pulse operation.

As an example, FIG. 7 also shows how a change to the pulse number PN=6 can be made in connection with the commutation of the machine-side converter. The activation of the pulse-number modulation is assumed to occur at t=t0. At t2 such a commutation is made that a change to 6-pulse operation occurs, and during the interval t3–t6 the converter is operating in stationary 6-pulse operation. By a commutation at t7, a return to 12-pulse operation is made. The commutating times t2 and t7 are so chosen that a change is made directly to stationary 6-pulse operation at t2 and to stationary 12-pulse operation at t7.

According to the invention, the activation and the deactivation, respectively, of the pulse-number modulation are preferably performed in such a way that the mean value of the intermediate-link current is not at all—or only insignificantly—influenced. The current measurement is therefore suitably synchronized with the commutations of the network-side converter. During stationary operation, the current is measured as a mean value between each pair of two consecutive commutations of the network-side converter. At 50 Hz power frequency the measurement time $\tau$ is thus 1.7 ms during 12-pulse operation, 3.3 ms during 6-pulse operation and so on. During the activation and the deactivation of the 10 pulse-number modulation, the current mean value should be maintained constant or practically constant. The increased ripple current which is caused by the reduction of the pulse number must therefore have a mean value which corresponds to the mean value of the natural ripple current of the converter. At a low phase advance level, that is, at a control angle $\alpha \approx 90°$, this mean value during 6-pulse operation and during 12-pulse operation is, with a very good approximation, $2/3$ of the peak value of the ripple current. At lower pulse numbers, this approximation is deteriorated to a certain extent.

When the system, in the manner described above, has determined which pulse number to be used, it is thus known which control actions have to be taken during the stationary operation with the lower pulse number. To change to another pulse number, with an unchanged current mean value, it is required that the commutation of the network-side converter is adapted such that, at the proper time, commutation is made to that voltage arc which applies during stationary operation at the new pulse number. As is shown in FIG. 7, the changes between 12-pulse operation and 3-pulse operation are made by commutations at the times t1 and t8, respectively, when the curves $i_{d(12)}$ and $i_{d(3)}$ intersect each other. In a corresponding way, the changes between 12-pulse operation and 6-pulse operation are made at the times t2 and t7 when the curves $i_{d(12)}$ and $i_{d(6)}$ intersect each other.

Figure 8:
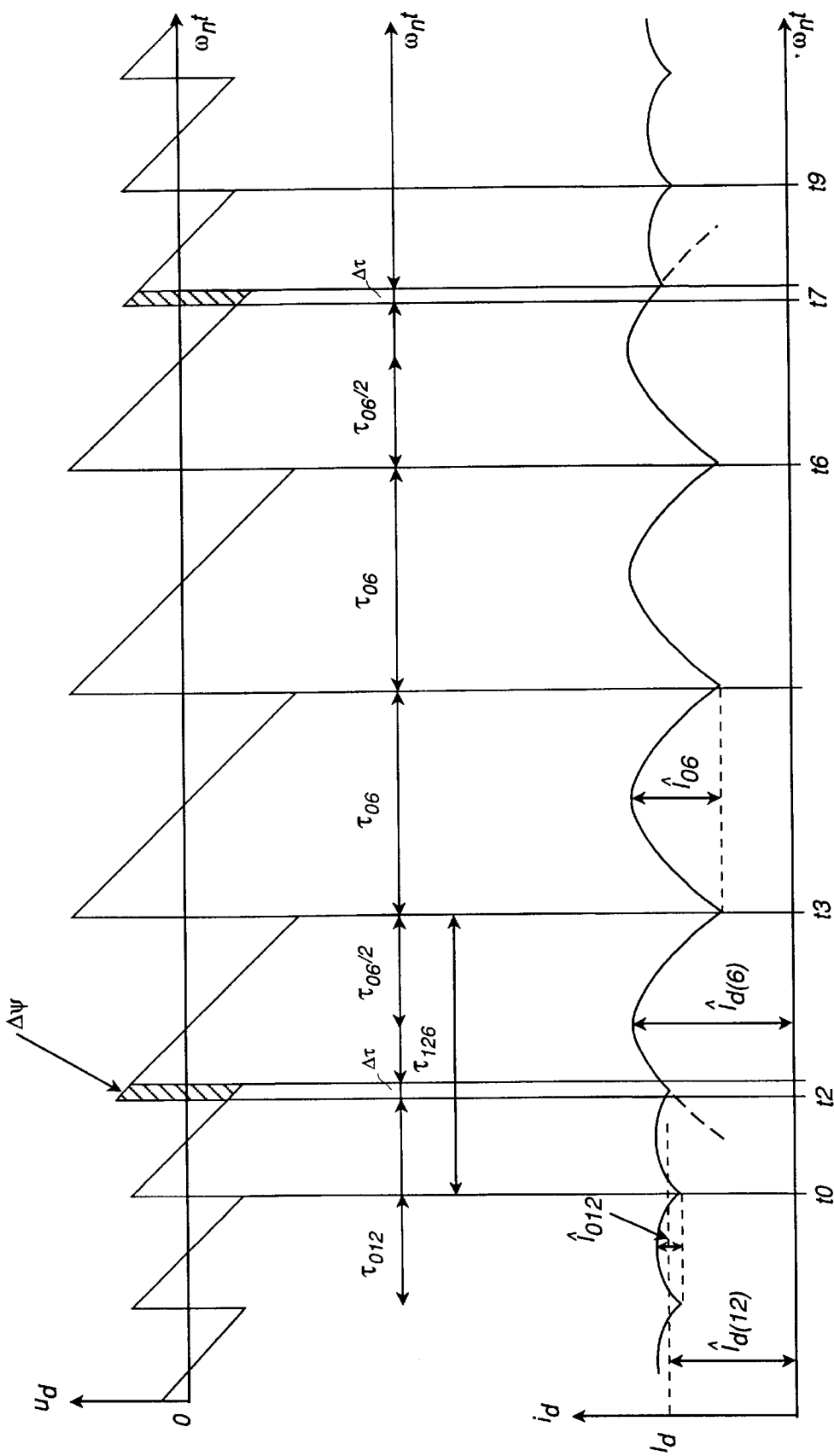
FIG. 8 illustrate how, according to a preferred embodiment of the invention, the commutating times are determined and the current is measured in such a way that the mean value thereof is kept constant both before and after and during the switching of the pulse number.

For the mean value of the current ripple to arrive at the correct value, from the mean value point of view, it is required that the dashed voltage-time area $\Delta\psi$ shown in FIG. 8 is added. During deactivation of the pulse-number modulation, the intermediate-link voltage shall be reduced by the corresponding voltage-time area.

The voltage-time area $\Delta\psi$ thus corresponds to an increase of the peak value of the intermediate-link current from $\hat{I}_{d(12)}$ to $\hat{I}_{d(6)}$. This current increase $$\Delta I_d = \hat{I}_{d(6)} - \hat{I}_{d(12)}$$

is achieved by the voltage-time area $\Delta\psi$ and thus the following applies $$\Delta I_d = \Delta\psi/L$$

As demonstrated in Török, Hibner: "Time Optimal Control of Converter-fed D.C. Drives", IEE 2nd International Conference on Electrical Variable-Speed Drives, London 25–27 Sep. 1979, pp 131–135, the limiting direct current during 6-pulse operation is $$\hat{I}_{06} = 1/8 \cdot 2\hat{U} \cdot \tau_{06} \cdot 1/L = \psi_{06} \cdot 1/L$$

where $\hat{U}$ is the peak value of the supply voltage of the network-side converter phase-to-phase to the respective network-side converter 3A and 3B in FIG. 1a. The stationary lead time during 6-pulse operation, $\tau_{06}$, is $1/6$ of the period of the network, T=1/f.

In similar manner, the following applies $$\hat{I}_{012} = 1/16 \cdot 2\hat{U} \cdot \tau_{012} \cdot 1/L = \psi_{012} \cdot 1/L$$

where $\tau_{012}$ is the stationary lead time during 12-pulse operation, that is, $1/12$ of the period of the network.

$\psi_{06}$ are $\psi_{012}$ are those values of the voltage-time area $\Delta\psi$ which apply during 6-pulse operation and during 12-pulse operation, respectively.

From the above-mentioned article, it is also known that, when advancing the commutation by 30° during 6-pulse operation, an extra voltage-time area of the magnitude $4\psi_{06}$ is obtained, which results in a current increase which increases the next current pulse peak value by $4\hat{I}_{06}$.

In a corresponding manner, during 12-pulse operation, advancing the commutation 15° results in an increase of the next current pulse peak value by $4\hat{I}_{12}$.

$$\Delta I_d = \hat{I}_{06} \cdot \Delta\tau/\tau_{06} = 8 \cdot \hat{I}_{012} \cdot \Delta\tau/\tau_{012}$$

The dynamic advance of the stationary thyristor firing which 10 has to be carried out is thus $$\Delta\tau = \Delta I_d / \hat{I}_{012} \cdot \tau_{012}/8$$

For each value of the pulse number PN, the current change $\Delta I_d$ is known, because $$\hat{I}_{d(12)} = I_d + 1/3 \cdot \hat{I}_{012}$$

and $$\hat{I}_{d(6)} = I_d + 1/3 \cdot \hat{I}_{06}$$

and the advance and the retardation $\Delta\tau$, respectively, can be determined.

At very low pulse numbers, preferably PN<3, a correction for the deviation of the sine wave from the straight line can suitably be introduced in the manner described in the article by Török, Hibner mentioned above.

If the current is measured as a mean value over the interval $\tau_{126}$ in FIG. 8, and if the advance of the commutation is determined according to the above, a measured value is obtained with a negligible deviation relative to the measured values obtained during the preceding interval $\tau_{012}$ and during the subsequent interval $\tau_{06}$, respectively. This means that the current regulator does not notice the change made in the pulse number (and nor does the speed regulator.

As will be clear from what is described above, a system according to the invention utilizes a natural current ripple, at a reduced pulse number of the network-side converter, in order to distort the current through the machine-side converter such that the commutating current of the machine will exceed the instantaneous value of the distorted current, during intervals when this instantaneous value is lowest, and where the duration of these intervals exceeds the recovery time of the thyristors. Only by a modification of the control system, a considerable increase of the commutating capability at low machine speeds is thus obtained according to the invention, and hence a possibility of operating with high currents during a shutdown or at low speeds.

The current control system maintains the mean value of the intermediate-link current at the desired value independently of changes in the pulse number, and this also while a commutation process is in progress in the machine-side converter. Contrary to what is the case during intermediate-link discontinuous current operation, no loss of current-time area during each machine commutation is obtained with the system according to the invention. The current mean value during each interval between two commutations in the network-side converter may be maintained constant with a high accuracy. Such low-frequency disturbances in the air-gap moment, which are caused by the fact that only two phases out of three carry current periodically, of course still remain and may excite the harmful mechanical natural oscillations mentioned in the introductory part of the description. However, the torque control does not perceive the disturbance since the current measurement does not do so, and by a suitable synchronization, the speed measurement as well as the speed control may be rendered insensitive to the forced disturbance, that is, the pulse-number modulation of the current. A prerequisite for the elimination of the low-frequency torque disturbances, which are caused by the commutation of the machine-side converter, has thus been created.

Because only two phases out of three carry current simultaneously, a motor drive of the type to which this application is related generates disturbances in the air-gap moment, the frequency $f_k$ of which is equal to the commutating frequency of the machine-side converter. In a 12-pulse machine-side converter disturbances of the frequency $f_k=12 \cdot f_m$ are generated, where $f_m$ is the frequency of voltage induced in the machine. If this frequency coincides or approaches a mechanical natural oscillation frequency of the drive system, disturbances arise in the shaft torque of the machine which are normally harmful.

With the system according to the invention, such a situation may be avoided by starting an oscillation of the commutating times of the machine-side converter, when the speed of the motor drive approaches a resonance frequency (e.g. $0{,}8 \cdot f_r < f_m < 1{,}2 \cdot f_r$). At a constant speed and firing angle, these times are normally equidistant at intervals of 30°. With the system according to the invention, that is, with pulse-number modulation of the intermediate-link current, the time of the commutation of the machine-side converter is determined by the time at which the modulated current receives its minimum value. This time may be changed, and thus the corresponding control angle, without jeopardizing the commutation of the current.

It is therefore possible, for example, to vary the commutating times such that the intervals between these alternate between 24° and 36°, which would correspond to control angles of 138° and 150° to the machine-side converter. In this way, the excitation of mechanical natural oscillations in the drive system can be avoided although the stationary commutating frequency of the drive system practically coincides with the natural frequency of the drive system.

The ripple in the motor current, increasing with reduced pulse number, has a high frequency, for example 300 Hz during 6-pulse operation and 150 Hz during 3-pulse operation. The mechanical system operates for these frequencies as a higher-order low-pass filter and effectively damps out these high frequencies. Torque pulsations transferred to the driven object therefore become unnoticeable and completely harmless.

An additional important advantage with the system according to the invention is that it makes possible a soft and, in principle, unnoticeable transition between on the one hand the lower speed range, where the machine-side converter needs commutation aid, and on the other hand the higher speed range where the machine has full commutating capability.

The embodiments described above are only examples, and a synchronous motor drive according to the invention may be designed in a large number of alternative ways. For example, it is thus possible and may be practically suitable to design both the network-side converter and the machine-side converter with other natural pulse numbers than that described above (12). Primarily, it would be a question of designing one of the converters or both the converters with the natural pulse number 6. If the machine-side converter is designed for the natural pulse number 6, it is, of course, necessary to design the synchronous machine with a single three-phase winding instead of the twelve-pulse winding described above. According to one of the many possible alternatives, the synchronous machine may be a 12-pulse machine with two three-phase winding systems in the manner described above with reference to FIG. 1, in which case each winding system has a separate intermediate-link converter, each one with, for example, a 6-pulse machine-side converter, a separate dc intermediate link and, for example, a 6-pulse network-side converter. Further, a synchronous motor drive according to the invention may be supplemented with means known per se for control of the current in such a way that such torque pulsations, which are caused by variations in the surrounded flux, are reduced or eliminated.

I claim:

1. A load-commutated synchronous motor drive, comprising
    a line-commutated network-side converter with dc terminals, with ac terminals for connection to an alternating voltage network (ACN), and said network side convertor being operative at a natural pulse number and being switchable to operate at a pulse number lower than the natural pulse number rate,
    a load-commutated machine-side converter with ac terminals for connection to a synchronous machine, and with dc terminals connected to the dc terminals of the network-side converter via a current-source dc intermediate link, wherein the motor drive comprises control members operative during commutation of the machine-side converter for switching the network-side converter for operation at said lower pulse number.

2. A synchronous motor drive according to claim 1, wherein the control members are operative, during a commutation in the machine-side converter, to determine, in dependence on actual operating quantities (Umφ, ωm) of the machine, whether the commutating capability of the machine is sufficient for commutation of the machine current (Im) in question and, if not, said control members being then operative to switch the network-side converter to operative with said lower pulse number.

3. A synchronous motor drive according to claim 2, wherein the control members are operative, with each commutation in the machine-side converter, to carry out said determination and switching.

4. A synchronous motor drive according to claim 2 wherein the control members are operative to calculate, as a measure of the commutating capability, the maximum current ($I_{Cmax}$) which the machine is able to commutate, to compare this current with the actual current ($I_d$), and, in dependence on this comparison, to execute the switching to a lower pulse number.

5. A synchronous motor drive according to claim 2, wherein the control members are supplied with the actual speed ($\omega_m$) and voltage (Umφ) of the machine and, in dependence on these quantities, to determine the commutating capability of the machine.

6. A synchronous motor drive according to any of claim 1, wherein said control members are operative to control operation of the network-side converter with any of a plurality of different pulse numbers lower than the natural pulse number, and, when the pulse number is reduced in connection with commutation of the machine-side converter, to determine the highest of said pulse numbers at which commutation of the actual current is ensured, and to switch the network-side converter for operation at such pulse number.

7. A synchronous motor drive according to claim 6, wherein the control members are operative, for determining the highest of said pulse numbers at which commutation of the actual current is ensured, to calculate the magnitude of the ripple component in the intermediate-link current for each one of a plurality of different pulse numbers and to compare the ripple components with the actual current ($I_d$).

8. A synchronous motor drive according to claim 7, wherein the control members are operative to compare the sum of the ripple component ($\Delta I_A$) and the calculated maximum current which the machine is able to commutate ($I_{cmax}$) with the actual current ($I_d$).

9. A synchronous motor drive according to claim 1, in which the network-side converter has the natural pulse number 12 and comprises two 6-pulse bridges operative, during 12-pulse operation, to operate mutually displaced in phase 30°, further including control members operative, for switching the converter to 6-pulse operation, to change the phase displacement between the bridge such that the commutations occur simultaneously in the two bridges.

10. A synchronous motor drive according to claim 1 with the network-side converter operating in 6-pulse operation, wherein the control members are operative, for achieving 3-pulse operation of the network-side converter, to omit every second commutation, upon starting each one of the remaining commutations to reduce the control angle of the converter by 60° and, after the start of the commutation, to restore the control angle to its original value.

11. A synchronous motor drive according to claim 1, wherein the control members are operative to execute the switching of the pulse number in such a way that the mean value of the current remains substantially unchanged.

12. A synchronous motor drive according to claim 1, wherein the control members are operative, when changing from operation with a first pulse number to operation with a second pulse number lower than the first pulse number of the network-side converter, to determine the time (t1) of that commutation by which the transition to the second pulse number takes place, so that the transition takes place directly to stationary operation with the second pulse number.

13. A synchronous motor drive according to claim 1, further comprising members adapted, in stationary operation, to form a measured value ($I'_d$) of the current ($I_d$) by determining the mean value of the current between two consecutive commutations in the network-side converter, wherein the control members are adapted, during transition in the network-side converter between operation with a first pulse number and a second pulse number lower than the first pulse number, to form the measured value of the current by determining the mean value of the current during the interval ($\tau_{126}$) from the last commutation (t0) during stationary operation with the first pulse number to the first commutation (t3) during stationary operation with the second pulse number.

14. A synchronous motor drive according to claim 1, wherein the control members are operative to execute the switching of the network-side converter to operation with a lower pulse number at a predetermined time after the start of a commutation in the machine-side converter.

15. A synchronous motor drive according to claim 14, wherein the control members are operative to maintain the network-side converter during operation with the lower pulse number during an interval of a predetermined duration and, thereafter, to execute the switching of the network-side converter to operation with the natural pulse number.

\* \* \* \* \*